(12) United States Patent
Kobayashi et al.

(10) Patent No.: US 8,546,039 B2
(45) Date of Patent: Oct. 1, 2013

(54) SOLID POLYMER FUEL CELL

(75) Inventors: Kenji Kobayashi, Tokyo (JP); Shoji Sekino, Tokyo (JP)

(73) Assignee: NEC Corporation, Tokyo (JP)

( * ) Notice: Subject to any disclaimer, the term of this patent is extended or adjusted under 35 U.S.C. 154(b) by 1131 days.

(21) Appl. No.: 12/312,547

(22) PCT Filed: Oct. 30, 2007

(86) PCT No.: PCT/JP2007/001187
§ 371 (c)(1),
(2), (4) Date: May 15, 2009

(87) PCT Pub. No.: WO2008/062551
PCT Pub. Date: May 29, 2008

(65) Prior Publication Data
US 2010/0055527 A1    Mar. 4, 2010

(30) Foreign Application Priority Data

Nov. 21, 2006    (JP) ................................ 2006-314511

(51) Int. Cl.
*H01M 2/00*    (2006.01)
(52) U.S. Cl.
USPC ........................... 429/463; 429/469; 429/506
(58) Field of Classification Search
None
See application file for complete search history.

(56) References Cited

U.S. PATENT DOCUMENTS

| | | | |
|---|---|---|---|
| 2004/0209136 A1* | 10/2004 | Ren et al. | 429/30 |
| 2004/0224207 A1* | 11/2004 | Kamo et al. | 429/32 |
| 2009/0061271 A1* | 3/2009 | Sekino et al. | 429/26 |

FOREIGN PATENT DOCUMENTS

| | | |
|---|---|---|
| JP | 2000-106201 | 4/2000 |
| JP | 2003-331899 | 11/2003 |
| JP | 2004-79506 | 3/2004 |
| JP | 2004-127524 | 4/2004 |
| JP | 2006-185783 | 7/2006 |
| JP | 2006-210109 | 8/2006 |
| WO | WO 2006/109645 A1 | 10/2006 |
| WO | WO 2006/120958 | 11/2006 |

OTHER PUBLICATIONS

Machine translation of JP 2003-331899.*

* cited by examiner

*Primary Examiner* — Maria J Laios
(74) *Attorney, Agent, or Firm* — McGinn Intellectual Property Law Group, PLLC (57) ABSTRACT

A solid polymer fuel cell that utilizes liquid fuel such as methanol should prevent generated water from residing in a ventilation port close to an anode, to thereby suppress degradation of a MEA. The fuel cell includes an anode, an anode-side collecting electrode, a sealing material located along a perimeter of a solid polymer electrolytic membrane and interleaved between the electrolytic membrane and the anode-side collecting electrode, and a discharging device that discharges a product generated through electric reaction on the anode. The sealing material is provided in a frame-shape around the anode. The discharging device is a ventilation port formed on the sealing material, and a water repellent material is provided at least one of inside the ventilation port and between the ventilation port and the anode.

20 Claims, 8 Drawing Sheets

Fig. 3

SOLID POLYMER FUEL CELL

TECHNICAL FIELD

The present invention relates to a solid polymer fuel cell that employs a solid polymer electrolytic membrane as electrolytic membrane, and liquid fuel containing methanol.

BACKGROUND ART

Development of solid polymer fuel cells that employ liquid fuel is being actively promoted for use as a power source for various electronic apparatuses including mobile phones, because such cells are easy to be made smaller in dimensions and lighter in weight.

The solid polymer fuel cell includes a Membrane and Electrode Assembly (MEA), in which a solid polymer electrolytic membrane is interleaved between an anode and a cathode. The fuel cell that directly supplies the liquid fuel to the anode is called a direct-type fuel cell, in which the supplied liquid fuel is decomposed on a catalyst carried by the anode, so that positive ion, electron and an intermediate product are given. In the fuel cell of this type, the positive ion thus generated further migrates to the cathode through the solid polymer electrolytic membrane, while the generated electron migrates to the cathode through an external load, to be reacted with oxygen in the atmosphere on the cathode, thereby generating electricity. In the direct methanol fuel cell (hereinafter, DMFC) that employs, for example, methanol aqueous solution as it is as the liquid fuel, the reaction represented by the formula (1) cited below takes place on the anode, and the reaction represented by the formula (2) cited below takes place on the cathode. As is apparent from these formulae (1) and (2), theoretically 1 mol of methanol and 1 mol of water are reacted on the anode to thereby give 1 mol of reaction product (carbon dioxide) on the DMFC, and since hydrogen ion and electron are also generated simultaneously, the theoretical concentration of methanol in the methanol aqueous solution, serving as the fuel, is approx. 70% in volume (vol. %).

(1)

(2)

It is known, however, that in the case where a relatively larger amount of alcohol fuel is supplied to the anode with respect to water, what is known as "cross-over effect" takes place in which the alcohol fuel is transmitted through the solid polymer electrolytic membrane without being involved in the reaction represented by the formula (1) cited above, to be reacted with the catalyst on the cathode, which results in decreased generation capacity and generation efficiency.

Techniques developed to suppress the cross-over effect include, for example as described in the Patent document 1, providing a porous material or the like that vaporizes the liquid fuel on the upstream side of the anode of the MEA, to thereby supply the vaporized liquid fuel. The Patent document 1 states the advantage thereof, for example as "Supplying thus the vaporized fuel allows maintaining the gas fuel in the fuel vaporization layer substantially saturated, the liquid fuel is vaporized in the amount corresponding to the consumption of the gas fuel in the fuel vaporization layer for the cell reaction, and then the liquid fuel of the amount corresponding to the vaporized amount is introduced into the cell via capillary effect. Thus, since the fuel supply amount is linked with the fuel consumption, the fuel is scarcely discharged unreacted out of the cell, which minimizes the need to provide a processing system on the fuel outlet side."

According to the Patent document 1, however, the fuel is supplied by pressure from the fuel source or a capillary effect or the like, which incurs the disadvantage that when the $CO_2$ gas generated on the anode resides between the anode and the gas-liquid separation membrane, the pressure against the liquid fuel source is increased and the fuel supply to the anode is thereby suppressed, and consequently the generation performance becomes unstable.

Figure 3:
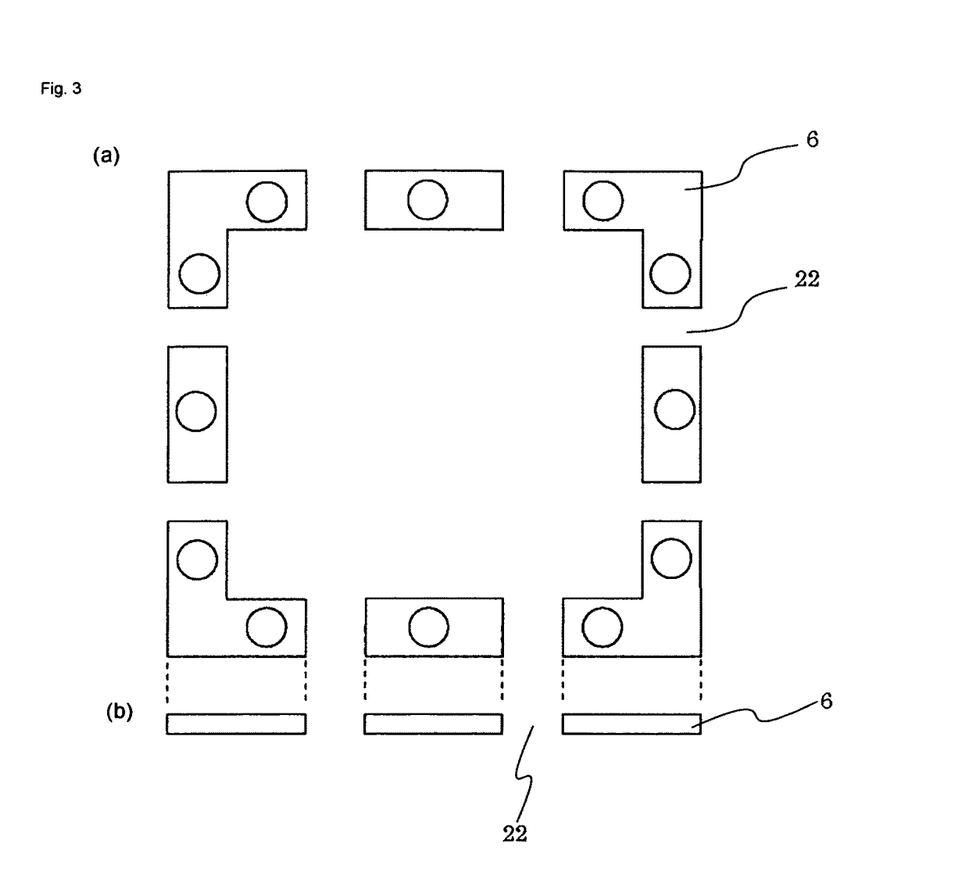
FIG. 3(a) is a plan view showing a structure of a conventional sealing material and FIG. 3(b) is a cross-sectional view, showing a structure of a conventional sealing material.

To resolve such problem, a fuel cell and a fuel cell system configured so as to efficiently discharge the generated $CO_2$ gas have been developed, as shown in FIG. 3.

According to such invention, the fuel cell includes a discharging device that discharges the product generated through the electric reaction on the anode (predominantly $CO_2$), and the discharging device is a ventilation port provided in a sealing material interleaved between the solid polymer electrolytic membrane the collecting electrode of the anode, and therefore the $CO_2$ can be discharged in a single direction from a lateral side of the anode, while the vaporized fuel is being supplied. Consequently, the $CO_2$ gas generated on the anode is prevented from residing between the anode and the fuel supply controller, so that the increase in pressure against the fuel source is prevented and sufficient fuel supply to the anode can be secured. Thus, the fuel cell incorporated with the technique as shown in FIG. 3 provides higher fuel consumption efficiency, and also higher stability in generating performance over a long period of time.

With the technique as shown in FIG. 3, however, there may be cases where degradation of the MEA is not sufficiently prevented. For example, if the fuel cell is left unused for a long time after generation, a portion of the anode and the anode-side collecting electrode close to the $CO_2$ gas outlet is prone to corrode. Such corrosion can be construed to take place through the following mechanism. First, the residual alcohol fuel on the anode is reacted, via the anode catalyst metal, with air introduced through the ventilation port lateral to the anode for discharging the $CO_2$ gas, and thereby water is generated in the vicinity of the ventilation port. Here, the ventilation port is constituted of the collecting electrode of a metal which is hydrophilic, and hence the water is encouraged to reside in its vicinity. Thus, the fuel density at the portion of the anode close to the ventilation port becomes locally uneven, and a partial cell is thereby formed. Consequently, the material constituting the anode and the collecting electrode is urged to corrode, which makes it difficult to sufficiently prevent the degradation.

To sufficiently suppress the degradation of the MEA, the water has to be kept from residing in the ventilation port for discharging the $CO_2$ gas in the vicinity of the anode.

[Patent document 1] JP-A No. 2000-106201

DISCLOSURE OF THE INVENTION

Problem to be Solved by the Invention

An object of the present invention is to provide a fuel cell that sufficiently suppresses the degradation of the MEA which may be incurred during the storage period originating from the structure as shown in FIG. 3.

According to the present invention, the portion corresponding to the ventilation port formed in the sealing material is constituted of a water repellent material, to thereby prevent the generated water from residing during the storage period. Also, the water repellent material is located in contact with the anode. Such structure allows preventing the generated water from residing in a region of the ventilation port close to the anode, thereby significantly suppressing the emergence of the partial cell and thus substantially suppressing the degradation of the MEA.

Means for Solving Problem

According to a first aspect of the present invention, there is provided a fuel cell comprising a solid polymer electrolytic membrane; a cathode attached to a side of the solid polymer electrolytic membrane in contact therewith; an anode attached to the other side thereof in contact therewith; a cathode-side collecting electrode and an anode-side collecting electrode disposed in contact with the cathode and the anode respectively, a sealing material located along a perimeter of the solid polymer electrolytic membrane and interleaved between the solid polymer electrolytic membrane and the anode-side collecting electrode; a fuel supply controller that vaporizes a liquid fuel and supplies the vaporized fuel to the anode; and a discharging device that discharges a product generated through electric reaction on the anode; wherein the sealing material is provided in a frame-shape around the anode; the discharging device is a ventilation port formed on the sealing material; and a water repellent material is provided inside the ventilation port, or between the ventilation port and the anode. In the fuel cell according to the first aspect of the present invention, the sealing material is provided in a frame-shape around the anode; the discharging device is a ventilation port formed on the sealing material; and an oil repellent material is further provided inside the ventilation port, or between the ventilation port and the anode. In the fuel cell according to the first aspect of the present invention, the water repellent material is disposed in contact with the anode. In the fuel cell according to the first aspect of the present invention, the water repellent material constituting the ventilation port is liquid-impermeable and gas-permeable. In the fuel cell according to the first aspect of the present invention, the sealing material is constituted of a plurality of fragmentary components, and the ventilation port is provided between the fragmentary components. In the fuel cell according to the first aspect of the present invention, the sealing material includes a recessed portion and a protruding portion, and the ventilation port corresponds to the recessed portion of the recessed and protruding portions. The foregoing structures restrict water, generated through reaction during an off time between air introduced through the ventilation port and the residual liquid fuel on the anode, from residing in the vicinity of the ventilation port. Accordingly, the fuel density is prevented from becoming uneven around a portion of the anode close to the ventilation port because of the residual water, and hence the emergence of a local partial cell can be prevented around the anode. Thus, the degradation of the MEA during a storage period, incidental to the conventional structure in which the ventilation port is an exposed hollow portion, can be substantially suppressed. In the case, in particular, where a material having low acid resistance is employed to constitute the collecting electrode and the anode base material, the foregoing benefit becomes more prominent. Further, also during the operation, wasteful consumption of the fuel through the ventilation port can be prevented.

Advantage of the Invention

Thus, the present invention provides a solid polymer fuel cell of a vaporizing type having a $CO_2$ gas outlet on a lateral side of the anode, configured to prevent water, which is generated through reaction between air introduced through the ventilation port during an off time and the residual liquid fuel on the anode, from residing in a region of the ventilation port close to the anode. The present invention enables, consequently, preventing the emergence of the partial cell on the anode, which has been a drawback incidental to the conventional structure, and thereby substantially suppressing the degradation of the generating unit.

BRIEF DESCRIPTION OF THE DRAWINGS

The above and other objects, features and advantages will become more apparent through the following preferred embodiments and the accompanying drawings.

BEST MODE FOR CARRYING OUT THE INVENTION

Figure 1:
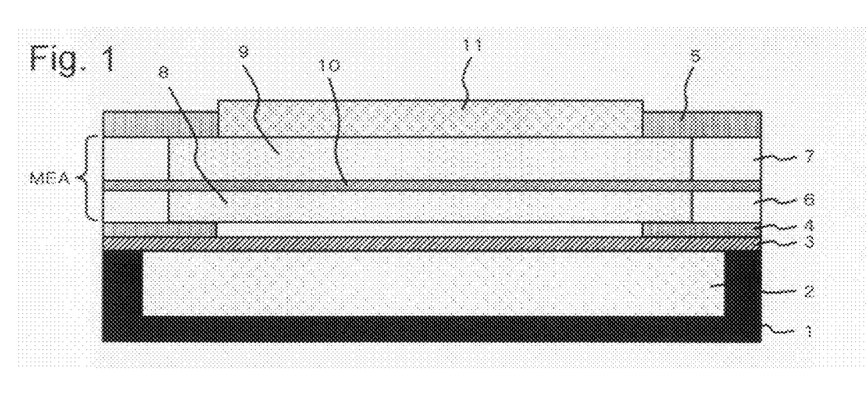
FIG. 1 is a schematic cross-sectional view showing an example of the cell structure of a solid polymer fuel cell according to the present invention.
Figure 2:
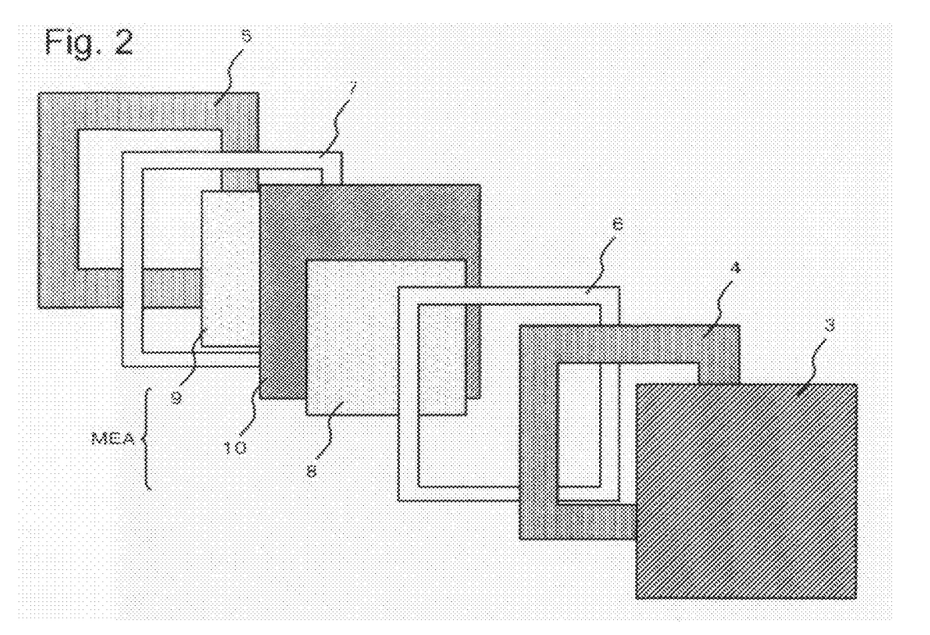
FIG. 2 is a schematic exploded perspective view showing a structural sequence from a MEA to a fuel control unit.

Hereunder, a fuel cell according to the present invention will be described. FIG. 1 is a schematic cross-sectional view showing an example of the cell structure of a solid polymer fuel cell according to the present invention, and FIG. 2 is a schematic exploded perspective view showing a structural sequence from a MEA to a fuel control unit. FIGS. 3(a) and 3(b) are a plan view and a cross-sectional view respectively, showing a structure of a conventional sealing material, and FIGS. 4 to 7 are plan views and cross-sectional views, each showing a structure of a sealing material according to the first embodiment of the present invention. It should be noted that the present invention is not limited to these drawings and to the embodiment described below.

[Fuel Cell]

The fuel cell according to the present invention at least includes, as shown in FIG. 1, a solid polymer electrolytic membrane 10, a cathode 9 located on a side of the solid polymer electrolytic membrane 10, an anode 8 located on the other side thereof, a cathode-side collecting electrode 5 and an anode-side collecting electrode 4 disposed in contact with the cathode 9 and the anode 8 respectively, a sealing material 6 located along the perimeter of the solid polymer electrolytic membrane 10 and interleaved between the solid polymer electrolytic membrane 10 and the anode-side collecting electrode 4, a fuel supply controller 3 that vaporizes liquid fuel and supplies the vaporized fuel to the anode 8, and a discharging device that discharges a product generated through electric reaction on the anode 8. Here, the cathode 9, the anode 8, and the solid polymer electrolytic membrane 10 constitute a MEA, and on the upper and lower faces of the MEA the anode-side collecting electrode 4 and the cathode-side collecting electrode 5 are press-bonded via the sealing material 6, 7 interleaved respectively therebetween.

The fuel cell shown in FIG. 1 also includes an evaporation suppression layer (moisture-retention layer) 11 that suppresses evaporation of generated water, located on the cathode 9 (upper portion in FIG. 1). To the fuel supply controller 3 a fuel tank 1 is attached, in which a fuel retainer 2 is inserted.

The fuel cell according to the present invention directly utilizes alcohol aqueous solution such as methanol as liquid fuel, and the generation is executed when the alcohol aqueous solution fuel is vaporized in the fuel supply controller 3 and supplied to the anode 8.

[MEA]

The MEA (Membrane and Electrode Assembly) has such a stacked structure that the solid polymer electrolytic membrane 10 is interleaved between the cathode 9 and the anode 8. As the solid polymer electrolytic membrane 10, polymer films that have corrosion-resistance against the fuel, high hydrogen ion (proton) conductivity, and low electron conductivity are suitably employed. Suitable materials for constituting the solid polymer electrolytic membrane 10 include ion-exchange resins having a polar group including a strong acid group such as sulfonyl group, phosphate group, phosphonic group, or phosphinic group, and weak acid group such as carboxyl group, specific examples of which include a perfluorosulfonic acid-based resin, sulfonated polyethersulfonic acid-based resin, and a sulfonated polyimide-based resin. More particularly, the solid polymer electrolytic membrane may be constituted of, for example, an aromatic polymer such as sulfonated poly(4-phenoxybenzoyl-1,4-phenylene), sulfonated polyetheretherketone, sulfonated polyethersulfone, sulfonated polysulfone, sulfonated polyimide, or alkylsulfonated polybenzoimidazole. The thickness of the solid polymer electrolytic membrane may be appropriately selected in a range of approx. 10 to 200 µm, according to the material and the purpose of the fuel cell.

[Cathode, Anode]

The cathode 9 is the electrode that reduces oxygen into water as expressed by the following formula (2):

$$6H^+ + 6e^- + 3/2 O_2 \rightarrow 3H_2O \tag{2}$$

The cathode may be formed, for example, by applying a catalyst layer constituted of particles (including powder) of a carrier such as carbon carrying a catalyst, or the catalyst alone without the carrier, and a proton conductor, to a base material such as a carbon paper. Examples of the catalyst include platinum, rhodium, palladium, iridium, osmium, ruthenium, rhenium, gold, silver, nickel, cobalt, lanthanum, strontium, yttrium, and so forth. The catalyst may be employed alone, or in a combination of two or more of those examples. Examples of the particles that carry the catalyst include carbon-based materials such as acetylene black, Ketjen Black, carbon nanotube, and carbon nanohorn. The particle size may be appropriately selected, for example in a range of approx. 0.01 to 0.1 µm, more preferably approx. 0.02 to 0.06 µm, in the case where a carbon-based material is employed. To cause the particles to carry the catalyst, for example a soaking process may be employed.

Examples of the base material on which the catalyst layer is formed include the solid polymer electrolytic membrane 10, and conductive porous materials such as a carbon paper, a carbon compact, a carbon sintered compact, a sintered metal, and a foamed metal. In the case of employing the carbon paper or the like as the base material, it is preferable to execute a hot-press process after forming the catalyst layer on the base material to thereby obtain the cathode 9, so as to bond the cathode 9 to the solid polymer electrolytic membrane 10 in such orientation that the catalyst layer is brought into contact with the solid polymer electrolytic membrane 10. The amount of the catalyst per unit area on the cathode 9 may be appropriately selected at a level not exceeding approx. 20 mg/cm$^2$, according to the type and size of the catalyst.

The anode 8 is the electrode that generates hydrogen ion, $CO_2$ gas, and electron from the alcohol aqueous solution such as methanol, and formed through a similar process to that of the cathode 9. The catalyst layer and the base material that constitute the anode 8 may be the same as or different from those of the cathode 9. The amount of the catalyst per unit area on the anode 8 may be appropriately selected at a level not exceeding approx. 20 mg/cm$^2$ as in the case of the cathode 9, according to the type and size of the catalyst.

[Collecting Electrode]

The cathode-side collecting electrode 5 and the anode-side collecting electrode 4 are located on the cathode 9 and the anode 8 respectively in contact therewith, to serve to improve the takeup efficiency and supplying efficiency of electron. The collecting electrodes 4 and 5 may be of a frame shape contacting the perimeter of the MEA as shown in FIG. 1, or of a plate shape or a mesh structure provided all over the MEA in contact therewith. Examples of the material of the collecting electrodes 4 and 5 include a stainless steel, a sintered metal, a foamed metal, and such metals plated with a highly conductive metal material.

[Sealing Material]

The fuel cell according to the present invention includes a plurality of sealing materials 6 and 7 which offers a sealing function. For example, as shown in FIG. 1, (i) between the solid polymer electrolytic membrane 10 and the cathode-side collecting electrode 5, the sealing material 7 of substantially the same thickness as the cathode 9 is disposed in a frame shape along the perimeter of the cell structure, and (ii) between the solid polymer electrolytic membrane 10 and the anode-side collecting electrode 4, the sealing material 6 of substantially the same thickness as the anode 8 is disposed in a frame shape along the perimeter of the cell structure. It is preferable that these sealing materials 6 and 7 are insulative, and hence a rubber material such as silicone rubber or a plastic material, which provides both the sealing function and the insulative effect, is normally employed.

In an embodiment of the present invention that significantly upgrades the storage characteristic, the ventilation port is constituted of a water repellent material, in either case where the ventilation port is a gap between a plurality of fragmentary components constituting the sealing materials 6 and 7, or a recessed portion of the sealing materials 6 and 7 that include the recessed portion and a protruding portion.

The ventilation port may also include an oil repellent material, in addition to the water repellent material. Such structure allows suppressing leakage of condensation of the vaporized liquid fuel.

It is preferable that the sealing materials 6 and 7 offer such level of sealing performance that prevents leakage of the fuel, and the sealing material 6 provided between the solid polymer electrolytic membrane 10 and the anode-side collecting electrode 4 includes a discharging device that efficiently discharges the $CO_2$ gas generated on the anode 8.

Providing such discharging device that discharges the product ($CO_2$ gas) generated through the electric reaction on the anode 8 improves the discharging efficiency of the $CO_2$ gas, thereby preventing the increase in internal pressure in the cell. Consequently, the fuel supply from the fuel supply controller 3 to the anode 8 can be secured free from disturbance.

[Water Repellent Material]

In the fuel cell according to the present invention, filling with the water repellent material 20 the hollow portion (ventilation port) of the sealing material 6 serving to discharge the $CO_2$ gas generated on the anode 8, or coating the inner wall of the ventilation port with the water repellent material 20, prevents the water generated during a storage period from residing in the ventilation port. Thus, the water generated during an off time is kept from residing in the vicinity of the ventilation port, and the fuel density at a portion of the anode 8 close to the ventilation port can be prevented from becoming uneven. Consequently, the emergence of the partial cell on the anode 8, which may take place in the case where the ventilation port is simply a hollow portion, can be suppressed.

Examples of the material of the water repellent material 20 include porous materials such as a fluorine-based resin and a silicon compound. The water repellent material 20 constituted of such material may be directly applied to the ventilation port, or a foamed material such as urethane which is coated with such water repellent material may be employed. Here, it is preferable to employ a liquid-impermeable but gas-permeable material to constitute the water repellent material 20, so as to prevent liquid from leaking outward. Alternatively, in the case of employing the material that is solely gas-permeable and liquid-impermeable as the water repellent material 20, the ventilation port may be occupied with such water repellent material 20.

The water repellent material 20 provided in the ventilation port may be located as close as possible to the anode 8. Minimizing thus the gap between the ventilation port and the anode 8 as much as possible allows substantially suppressing the emergence of the local partial cell. To attain a prominent effect of preventing residence of the generated water, it is preferable that 50 vol. % or more of the ventilation port is occupied with the water repellent material 20. Such effect can be further enhanced by locating the water repellent material 20 with a spacing of 3 mm or less from the portion of the anode 8 confronting the ventilation port.

[Oil Repellent Material]

In the fuel cell according to the present invention, the oil repellent material may further be provided at least one of inside of the ventilation port and on a region between the ventilation port and the anode 8. Alternatively, the inner wall of the ventilation port may be coated with the oil repellent material. The water repellent material 20 and the oil repellent material may be employed in combination. In this case, the condensation of the vaporized liquid fuel can be prevented from leaking. Examples of the material of the oil repellent material include porous materials constituted of a fluorine-containing polymer containing a fluoric resin having a fluorine-containing aliphatic ring and a polyfluoroalkyl group, such as GORE™ vent filter (from Japan Goatex Co. Ltd.). The oil repellent material may be located as close as possible to the anode 8. Minimizing thus the gap between the ventilation port and the anode 8 as much as possible allows substantially suppressing the emergence of the local partial cell originating from the condensation of the vaporized liquid fuel.

The structure of the ventilation port will now be described in details.

FIGS. 4 to 7 illustrate the structures in which the water repellent material 20 is located in the ventilation port 22 formed in the sealing material 6 interleaved between the solid polymer electrolytic membrane 10 and the anode-side collecting electrode 4. Although FIGS. 4 to 7 illustrate the structure in which the water repellent material 20 is provided to all of the ventilation ports 22, the water repellent material 20 may be replaced with the oil repellent material, and the ventilation port 22 may be only partially filled with the water repellent material 20. FIGS. 4 to 7 are plan views and cross-sectional views, showing the structure of the sealing material according to the first embodiment of the present invention.

Figure 4:
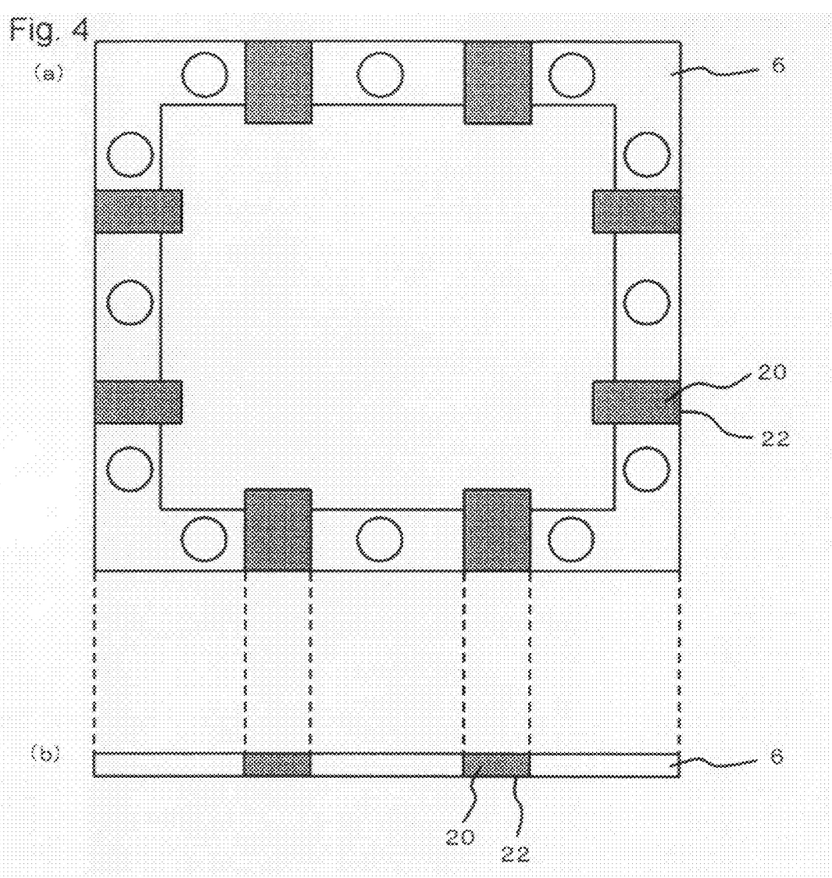
FIG. 4(a) is a plan view showing a structure of a sealing material according to a first embodiment of the present invention and FIG. 4(b) is a cross-sectional view showing a structure of a sealing material according to a first embodiment of the present invention.
Figure 5:
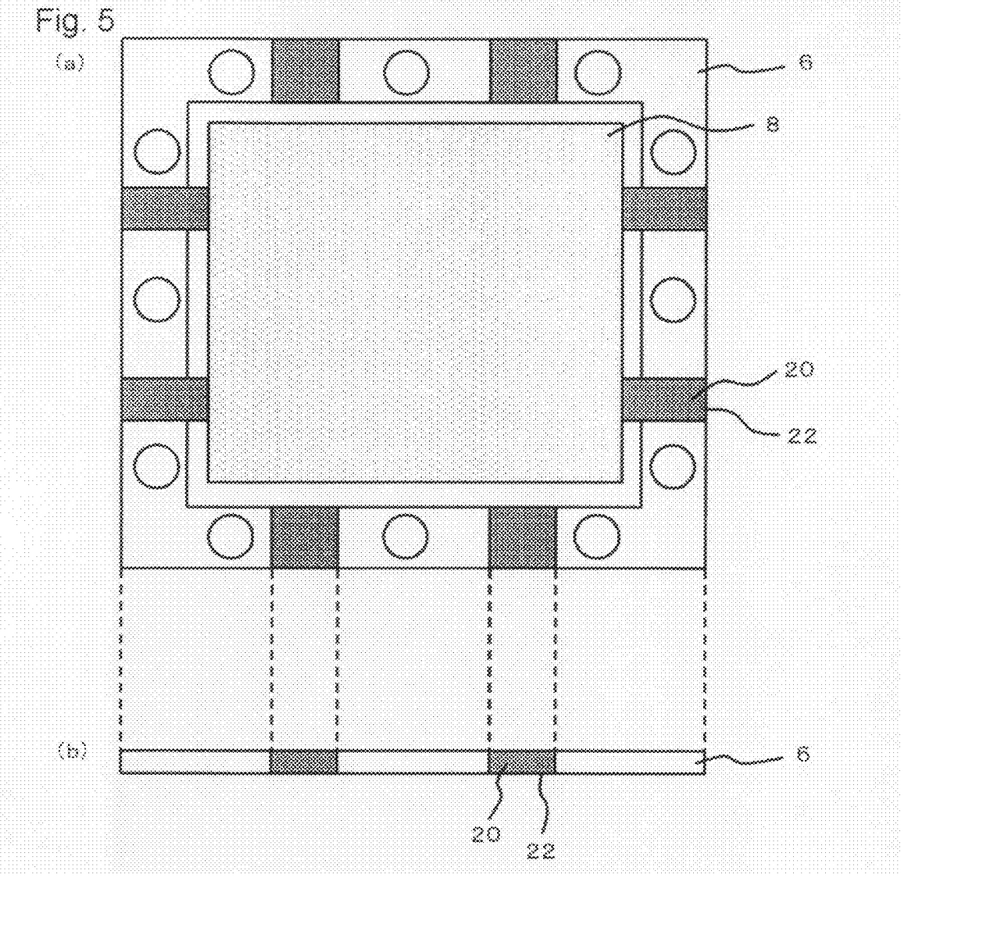
FIG. 5(a) is a plan view showing a structure of another sealing material according to the first embodiment of the present invention and FIG. 5(b) is a cross-sectional view showing a structure of another sealing material according to the first embodiment of the present invention.
Figure 6:
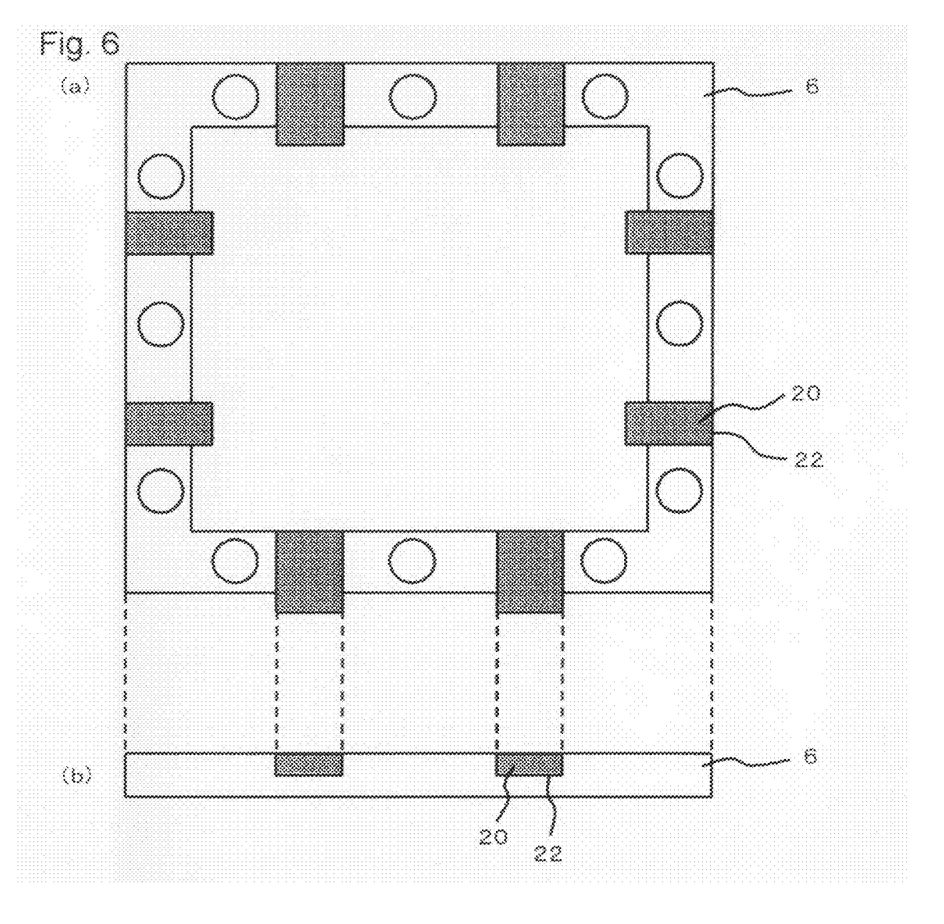
FIG. 6(a) is a plan view showing a structure of still another sealing material according to the first embodiment of the present invention and FIG. 6(b) is a cross-sectional view showing a structure of still another sealing material according to the first embodiment of the present invention.
Figure 7:
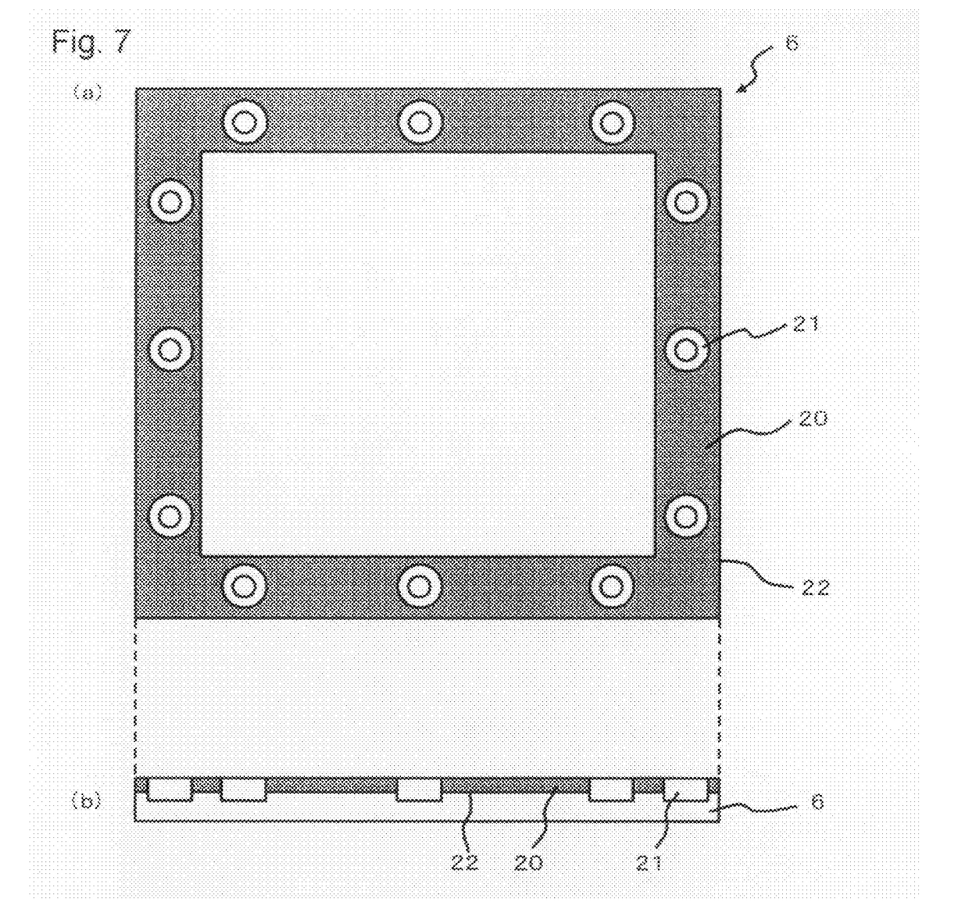
FIG. 7(a) is a plan view showing a structure of still another sealing material according to the first embodiment of the present invention and FIG. 7(b) is a cross-sectional view showing a structure of still another sealing material according to the first embodiment of the present invention.

For example, (i) as shown in FIGS. 4(*a*) and 4(*b*), the sealing material 6 may be constituted of a plurality of fragmentary components, so that a gap defined between the fragmentary components can be utilized as the ventilation port 22, and such gap may be filled with the water repellent material 20; (ii) as shown in FIGS. 6(*a*) and 6(*b*), a recessed cutaway portion may be formed on the sealing material 6, so that the recessed portion can be utilized as the ventilation port 22, and such recessed portion may be filled with the water repellent material 20; and (iii) as shown in FIGS. 7(*a*) and 7(*b*), a cylindrical spacer 21 may be located at a screw hole on the sealing material 6, so that a gap between the adjacent spacers can be utilized as the ventilation port 22, and such gap may be filled with the water repellent material 20. Also, as shown in FIGS. 5(*a*) and 5(*b*), it is preferable that the water repellent material 20 is located so as to contact the anode 8. Here, FIGS. 3(*a*) and 3(*b*) are a plan view and a cross-sectional view respectively, showing a structure of a conventional sealing material. As illustrated therein, the ventilation port 22 is simply a hollow portion.

In FIGS. 4 to 7, the sealing material 6 may be fixed with an adhesive or the like, other than screwing. The sealing material 7 may also be configured similarly to the sealing material 6.

Examples of the material of the cylindrical spacer 21 include plastics such as vinyl chloride, PET, and PEEK, and rubbers such as silicone rubber and butyl rubber.

Although the number or size of the ventilation ports 22 is not specifically limited, it is preferable that a sufficient number or sufficient size that allow efficiently discharging the $CO_2$ gas. Also, the ventilation port 22 may be provided on all the four sides of the rectangular frame-shaped sealing material as shown in FIGS. 4 to 7, or only on two sides opposing each other. In the case where the ventilation ports 22 are provided on two opposing sides of the sealing materials 6, 7, the $CO_2$ gas discharge against air flow in a certain direction is suppressed as will be subsequently described regarding the fuel cell system, and hence a sufficient amount of air can be supplied to each fuel cell. Consequently, the generation efficiency can be improved. Preferably, the specific size of the ventilation port 22 is to be determined through an optimization study.

[Fuel Supply Controller]

The fuel supply controller 3 serves to vaporize the fuel and to control the supply of the vaporized fuel, so as to suppress the cross-over to the anode 8. Owing to such function, the liquid fuel can be supplied to the anode 8 in an optimal condition, and thereby stable generating performance can be continued. To the fuel supply controller 3, the fuel is supplied from the fuel tank 1.

The fuel supply controller 3 is fixed in contact with the fuel tank 1 containing a fuel retainer 2 called a wicking material, and may be constituted of a material capable of separating liquid in a gaseous state (steam) with a film-saturation steam pressure. Examples of such material include a water repellent or oil repellent PTFE porous material, and a hydrophilic ion-exchange membrane. The fuel supply amount to the fuel supply controller 3 has to be at least equivalent to the consumption by the generating unit, and is determined by the permeation rate with respect to the liquid fuel, which depends on the thickness of the fuel supply controller 3 and the porosity of the material employed.

[Fuel Tank Unit]

The fuel tank unit 1 contains the fuel retainer called a wicking material, and also includes a fuel inlet at a predetermined position. The fuel retainer serves to retain an alcohol aqueous solution such as methanol through a capillary effect. Examples of such material include a woven fabric, a nonwoven cloth, a fiber mat, a fiber web, and a foamed plastic, and it is particularly preferable to employ a hydrophilic material such as a hydrophilic urethane foamed product or hydrophilic glass fiber. During the generation, it is desirable that the entire surface of the fuel retainer is brought into contact with the fuel supply controller 3, to thereby stabilize the fuel supply.

[Evaporation Suppression Layer]

The evaporation suppression layer 11 serves to suppress the transpiration of water generated on the cathode 9 through the generating process. The evaporation suppression layer 11 may be constituted of a hydrophilic material such as a woven fabric, a nonwoven cloth, a fiber mat, a fiber web, and a foamed plastic, and it is preferable that such material is covered with the water repellent material 20.

The fuel cell according to the present invention is applicable to either a single stack structure or a multilevel stack structure. Also, the present invention is expected to exhibit the advantageous effect with both an active type fuel cell that employs an auxiliary equipment such as a fuel pump, and a passive type fuel cell without the auxiliary equipment.

EXAMPLES

Hereunder, the fuel cell according to the present invention will be specifically described based on examples.

Example 1

The single cell type fuel cell shown in FIG. 1 was made up through the following procedure.

Firstly catalyst-carrying carbon fine particles, containing 55 wt. % of Pt (platinum) fine particles of 3 to 5 nm in diameter in carbon particles (Ketjen Black EC600JD from Lion Corporation), were prepared, and an appropriate amount of 5 wt. % Nafion solution (Article No. DE521, Nafion is a registered trademark of I. E. du Pont de Nemours & Company, Inc.) was added to 1 g of the catalyst-carrying carbon fine particles and stirred, to thereby obtain a catalyst paste for the cathode. The catalyst paste was applied to a carbon paper (TGP-H-120 from Toray Industries, Inc.), employed as the base material, at a rate of 8 mg/cm$^2$ and dried, thus to make up the cathode of 4 cm×4 cm. Also, a catalyst paste for the anode was prepared through the same procedure as that for the catalyst paste for the cathode, except that Pt—Ru (ruthenium) alloy fine particles (containing 60 at % of Ru) of 3 to 5 nm in diameter were employed instead of the Pt fine particles. Then the anode was made up through the same procedure as that for the cathode, except for employing the latter catalyst paste.

Then a film constituted of Nafion 117 from DuPont of 8 cm×8 cm×thickness of 180 μm was employed as the solid polymer electrolytic membrane. The cathode was placed on one of the faces in the thicknesswise direction of the solid polymer electrolytic membrane, such that the carbon paper was exposed, and the anode was placed on the other face thereof such that the carbon paper was exposed, and such assembly was hot-pressed from the side of the respective carbon papers. The cathode and the anode were bonded to the solid polymer electrolytic membrane, and thereby a MEA (Membrane and Electrode Assembly) was obtained.

A rectangular frame-shaped stainless steel plate (SUS316) of 200 μm in thickness was then employed to form the anode-side collecting electrode and the cathode-side collecting electrode of 6 cm$^2$ in outer size, 1 mm in thickness and 11 mm in width, and these electrodes were placed on the cathode and the anode. Also, between the solid polymer electrolytic membrane 10 and the anode-side collecting electrode, the sealing material made of a rectangular frame-shaped silicone rubber plate of an outer size of 6 cm$^2$ in outer size, 0.3 mm in thickness and 10 mm in width was placed. In such sealing material, a recessed portion of 0.5 mm in width was formed by cutting away at two locations on each of the four sides, to thereby form the ventilation ports. Then a PTFE porous material of 0.25 mm in thickness, 0.5 mm×12 mm in size and 85% in porosity was laid over each of such recessed portions. Here, the PTFE membrane is slightly longer than the width of the sealing material, so as to contact the anode. The sealing material was also provided between the solid polymer electrolytic membrane and the cathode-side collecting electrode.

Then a PTFE porous film (pore diameter 1.0 μm, porosity 80%) of 8 cm×8 cm×thickness of 50 μm was employed as the fuel supply controller. On the cathode 9, a cotton fiber matt cut in a size of 35 mm$^2$ was placed as the evaporation suppression layer 11 (moisture retention layer), and a PTFE perforated sheet of 0.5 mm in thickness, 0.75 mm in hole diameter and 5% in porosity was placed as the cover to thereby fix the evaporation suppression layer 11. Then a polypropylene container of 6 cm$^2$ in outer size, 8 mm in height, 44 mm$^2$ in inner size and 3 mm in depth was employed as the fuel tank 1, on a lateral side of which a fuel inlet for fuel supply was formed and in which a wicking material made of a urethane material was placed as the fuel retainer.

The MEA, the cathode-side collecting electrode, the anode-side collecting electrode, the fuel supply suppression layer, the sealing material, and evaporation suppression layer were fixed with a predetermined number of screws and unified, and thus the fuel cell according to the example 1 was obtained.

Comparative Example 1

A fuel cell according to a comparative example 1 was made up through the same procedure as the example 1, except that the PTFE porous material was not provided on the ventilation port formed as the recessed portion on the anode-side sealing material.

[Experiment and Result]

First, 15 ml each of 10 vol. % methanol aqueous solution was injected into the fuel tank of the fuel cell according to the example 1 and that of the comparative example 1, and a generation experiment was executed at the current of 1 A in the ambient atmosphere under a temperature of 25° C. After the generation was stopped, the moisture retention layer was sealed with silicone rubber for protection of the cathode, and the fuel cells were stored for a week under room temperature.

Figure 8:
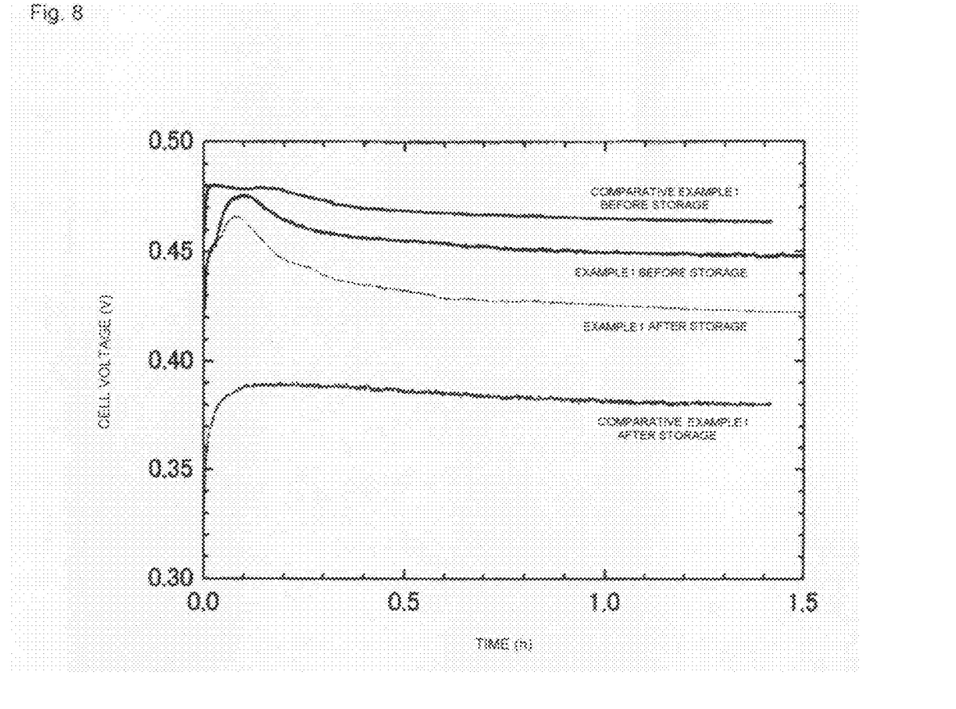
FIG. 8 is a graph showing generation characteristics of fuel cells according to an example 1 and a comparative example 1, before and after storage.

One week later the fuel was replaced and the sealing material on the moisture retention layer was removed, and then the generation experiment was again executed at the current of 2 A in the ambient atmosphere under a temperature of 25° C. FIG. 8 is a graph showing generation characteristics of fuel cells according to the example 1 and the comparative example 1, before and after the storage. The cell voltage before the storage of the comparative example 1 is higher than that of the example 1. This is because the example 1 includes the water repellent porous material in the ventilation port, and hence exhibits lower $CO_2$ gas discharging performance than the comparative example 1. Regarding the generation characteristic after the storage, however, the example 1 has not shown a remarkable decline in voltage, while the comparative example 1 has shown a significant decline in voltage.

Upon decomposing the cell after the generation experiment, it was found that a portion of the collecting electrode $CO_2$ gas outlet had corroded in the comparative example 1. The fuel cells were again decomposed after the storage but before the generation, and it was found that yellow liquid was observed on a portion of the collecting electrode close to the $CO_2$ gas outlet, in the comparative example 1. Through X-ray fluorescence analysis of this liquid, it proved that predominantly iron and ruthenium had precipitated. This indicates that in the comparative example 1 the residual water in the ventilation port and the methanol fuel on the anode formed a partial cell, which provoked the decomposition of the electrode. However, such phenomenon was not observed and the cell characteristic did not change in the example 1, and therefore it may be concluded that applying the present invention successfully suppressed the emergence of the partial cell, to thereby prevent the degradation in characteristics through the storage period of the fuel cell.

Example 2

Then a comparative experiment was carried out with different areas of the PTFE material to be provided on the ventilation port. The same experiment as above was carried out, under three different settings of the PTFE material, namely (1) the same length as the width of the sealing material (along the discharging direction), (2) the length of half a width of the sealing material and located on a region closer to the anode, and (3) the same length as above (2) but located on a region farther from the anode, and fluctuation of the voltage before and after the storage was observed. As shown in table 1 below, the decline in voltage was larger in the order of example 1<example 2(1)<example 2(2)<example 2(3)<comparative example 1. This indicates that it is desirable that the water repellent material is provided so as to cover at least 50% of the ventilation port, and that the spacing from the anode surface is as small as possible. (The spacing should not exceed 3 mm, to attain a sufficient effect.)

The table 1 shows the decline in voltage (%) with the example 2, before and after the storage.
[Table 1]

TABLE 1

|  | Example 2 (1) | Example 2 (2) | Example 2 (3) | Example 1 |
|---|---|---|---|---|
| VOLTAGE DECLINE (%) | 10 | 12 | 16 | 7 |

Example 3

On the surface of the anode, in the MEA according to the example, confronting the ventilation port, an appropriate amount of 5% PTFE aqueous solution was applied and dried, and the same PTFE treatment was also applied to the surface of the frame-shaped anode-side collecting electrode. Such anode and collecting electrode were assembled in the cell without providing the PTFE porous material on the ventilation port, to thereby obtain the fuel cell. Then the same experiment as with the example 1 was carried out, and fluctuation in generation characteristic before and after the storage was observed. As a result, the decline in voltage proved to be approx. 12%, which was superior to that of the comparative example 1. However, the decline in voltage was slightly larger than that of the example 1. This is presumably because a larger portion of the ventilation port is exposed to the ambient atmosphere, which incurs greater influence of the residual water.

The invention claimed is:

1. A fuel cell, comprising:
a solid polymer electrolytic membrane;
a cathode disposed in contact with a side of said solid polymer electrolytic membrane, and an anode disposed in contact with another side thereof;
a cathode-side collecting electrode and an anode-side collecting electrode disposed in contact with said cathode and said anode, respectively;
a sealing material located along a perimeter of said solid polymer electrolytic membrane, and interleaved between said solid polymer electrolytic membrane and said anode-side collecting electrode;
a fuel supply controller that vaporizes a liquid fuel and supplies said vaporized fuel to said anode, said sealing material being disposed on a surface of said anode-side collecting electrode that opposes another surface of said anode-side collecting electrode that is disposed on a surface of said fuel supply controller; and
a discharging device that discharges a product generated through an electric reaction on said anode,
wherein said sealing material is provided in a frame-shape around said anode, and
wherein said discharging device includes a ventilation port formed on said sealing material, and a water repellent material is provided at least at one of an inside of said ventilation port and between said ventilation port and said anode.

2. The fuel cell as set forth in claim 1, further comprising an oil repellent material, located at least at one of the inside of said ventilation port and between said ventilation port and said anode.

3. The fuel cell as set forth in claim 1, wherein said water repellent material and said anode are disposed in contact with each other.

4. The fuel cell as set forth in claim 1, wherein an inner wall of said ventilation port is coated with said water repellent material.

5. The fuel cell as set forth in claim 1, wherein said ventilation port is at least partially filled with said water repellent material.

6. The fuel cell as set forth in claim 2, wherein said oil repellent material and said anode are disposed in contact with each other.

7. The fuel cell as set forth in claim 2, wherein an inner wall of said ventilation port is coated with said oil repellent material.

8. The fuel cell as set forth in claim 2, wherein said ventilation port is at least partially filled with said oil repellent material.

9. The fuel cell as set forth in claim 1, wherein said water repellent material is liquid-impermeable and gas-permeable.

10. The fuel cell as set forth in claim 1, wherein said sealing material includes a plurality of fragmentary components, and said ventilation port is provided between said fragmentary components.

11. The fuel cell as set forth in claim 1, wherein said sealing material includes a recessed portion and a protruding portion, and said ventilation port includes said recessed portion.

12. The fuel cell as set forth in claim 2, wherein said water repellent material is liquid-impermeable and gas-permeable.

13. The fuel cell as set forth in claim 3, wherein said water repellent material is liquid-impermeable and gas-permeable.

14. The fuel cell as set forth in claim 4, wherein said water repellent material is liquid-impermeable and gas-permeable.

15. The fuel cell as set forth in claim 2, wherein said sealing material includes a plurality of fragmentary components, and said ventilation port is provided between said fragmentary components.

16. The fuel cell as set forth in claim 3, wherein said sealing material includes a plurality of fragmentary components, and said ventilation port is provided between said fragmentary components.

17. The fuel cell as set forth in claim 4, wherein said sealing material includes a plurality of fragmentary components, and said ventilation port is provided between said fragmentary components.

18. The fuel cell as set forth in claim 5, wherein said sealing material includes a plurality of fragmentary components, and said ventilation port is provided between said fragmentary components.

19. The fuel cell as set forth in claim 6, wherein said sealing material includes a plurality of fragmentary components, and said ventilation port is provided between said fragmentary components.

20. The fuel cell as set forth in claim 7, wherein said sealing material includes a plurality of fragmentary components, and said ventilation port is provided between said fragmentary components.

* * * * *